United States Patent [19]

Woodling

[11] 4,394,112

[45] Jul. 19, 1983

[54] COMBINATION ROLLER TOOTH SET HAVING ROLLER TEETH AND CONCAVE SURFACES DISPOSED TO ENGAGE EACH OTHER

[76] Inventor: George V. Woodling, 22077 Lake Rd., Rocky River, Ohio 44116

[21] Appl. No.: 292,523

[22] Filed: Aug. 13, 1981

Related U.S. Application Data

[63] Continuation of Ser. No. 103,905, Dec. 17, 1979, abandoned.

[51] Int. Cl.³ .................. F01C 1/113; F16H 1/28; F16H 55/10
[52] U.S. Cl. .................. 418/61 B; 74/465; 74/805
[58] Field of Search .............. 418/61 B, 225; 74/465, 74/804, 805

[56] References Cited

U.S. PATENT DOCUMENTS

| | | | |
|---|---|---|---|
| 3,270,683 | 9/1966 | McDermott | 418/61 B |
| 3,289,602 | 12/1966 | Hudgens | 418/61 B |
| 3,316,814 | 5/1967 | Charlson | 418/61 B |
| 3,723,032 | 3/1973 | Woodling | 418/61 B |
| 3,930,766 | 1/1976 | Swedberg | 418/61 B |
| 3,979,167 | 9/1976 | Grove | 418/61 B |
| 4,087,215 | 5/1978 | Miller | 418/61 B |

Primary Examiner—John J. Vrablik
Attorney, Agent, or Firm—Woodling, Krost & Rust

[57] ABSTRACT

The disclosure is directed to a combination roller set comprising an inside body member having a first longitudinal body axis and an outside body member surrounding said inside body member and having a second longitudinal body axis substantially parallel to said first body axis. The first body axis and said second body axis are displaced from each other. The body axis of said body members is disposed to provide an orbital movement about the body axis of the other said body members. The inside and outside body members are respectively provided with a plurality of roller teeth disposed to mesh with each other and define a mesh relationship. One or both of the body members may be provided with concave surfaces. At least one of said concave surfaces and at least a roller tooth in the other of said body members is disposed to engage each other in said mesh relationship and provide a contact engagement therebetween.

3 Claims, 6 Drawing Figures

COMBINATION ROLLER TOOTH SET HAVING ROLLER TEETH AND CONCAVE SURFACES DISPOSED TO ENGAGE EACH OTHER

This a continuation of application Ser. No. 103,905, filed Dec. 17, 1979, now abandoned.

My combination roller tooth set comprises an inside body member having a first longitudinal body axis and an outside body member surrounding said inside body member and having a second longitudinal body axis substantially parallel to said first body axis. The first body axis and said second body axis are displaced from each other. The body axis of one of said body members is disposed to provide an orbital movement about the body axis of the other of said body members.

The inside body member is provided with a plurality of inside roller teeth disposed substantially parallel to and extending circumferentially around said first body axis as a center. All of the inside roller teeth have substantially the same diameter and are spaced apart, one from the other, in a circumferential direction and define inside adjacent roller teeth having substantially equal inside intervals therebetween. The outside body member is provided with a plurality of outside roller teeth disposed substantially parallel to, and extending circumferentially around, said second second body axis as a center. All of the outside roller teeth have substantially the same diameter and are spaced apart, one from the other, in a circumferential direction and define outside adjacent roller teeth having substantially equal outside intervals therebetween.

The total of one of said plurality of roller teeth is one less in number than that of the other of said plurality of roller teeth. The inside body member is provided with a plurality of outwardly facing roller recesses into which the inside roller teeth may be respectively mounted. The outside body member is provided with a plurality of inwardly facing roller recesses into which said outside roller teeth may be respectively mounted. The inside and the outside roller teeth are disposed to mesh with each other and provide a mesh relationship therebetween.

One or both of said body members may be provided with a plurality of longitudinally extending concave surfaces respectively disposed between, and in parallel relation to, the adjacent roller teeth thereof. At least one of the concave surfaces and at least a roller tooth in the other of said body members are disposed to engage each other in said mesh relationship and provide a contact engagement therebetween. In order to limit the extent of the mesh relationship, each roller tooth in one of said plurality of roller teeth has a diameter greater than the respective intervals between the adjacent roller teeth in the other of said plurality of roller teeth.

The combination of the inside and outside body members together with the roller teeth therein defines two fluid chambers between the body members. One of the fluid chambers acts as an inlet chamber while the other acts as an outlet chamber. Operating fluid is supplied to and from the chambers by means of valve passageways commutated in sequence with the orbital cycle.

A significant advantage of my inside and outside roller tooth set is that both may be readily "center-machined"; that is, machined with reference to turning centers. In my invention, there are no generated teeth and for this reason my combination roller tooth set is not a Generated rotor, nor a Gerotor.

An object of my invention is to provide a roller tooth set which may be machined with reference to turning centers.

Another object is to provide a non-generated rotor and thereby reduce manufacturing expense.

Another object is to reduce tooth wear as well as tooth friction.

Another object is to prevent leakage from flowing between one fluid chamber to the other.

Another object is to provide concave surfaces in one or both of my body members.

Another object is to provide for at least one of the concave surfaces and for at least one of the roller teeth in the other of said body members to engage each other and define a contact engagement therebetween.

Another object is to provide for each roller tooth in one of said plurality of roller teeth to have a diameter greater than the respective intervals between the adjacent roller teeth in the other of said plurality of roller teeth.

Another object is to limit the extent of the mesh relationship between the inside and outside roller teeth.

Another object is to provide for the roller recesses to have substantially the same diameter as that of the roller teeth mounted therein and thereby respectively define a firm rollable fit therebetween.

Another object is to provide for a modified roller recess wherein a roller tooth therein may respectively move in a circumferential direction.

Another object is to provide for a distended circumferential recess.

Another object is to provide for the roller teeth mounted in the distended circumferential recesses to distensibly move under the force of fluid pressure acting thereagainst

SUMMARY OF THE INVENTION

The invention constitutes an inside and an outside combination roller tooth set comprising an inside body member having a first longitudinal body axis, an outside body member surrounding said inside body member and having a second longitudinal body axis substantially parallel to said first body axis, said first body axis and said second body axis being displaced from each other, said body axis of one of said body members providing an orbital movement about the body axis of the other of said body members, said inside body member having therein a plurality of inside roller teeth disposed substantially parallel to and extending circumferentially around said first body axis as a center, all of said inside roller teeth having substantially the same diameter and being spaced apart one from the other in a circumferential direction and defining inside adjacent roller teeth having substantially equal intervals therebetween, said outside body member having therein a plurality of outside roller teeth disposed substantially parallel to and extending circumferentially around said second body axis as a center, all of said outside roller teeth having substantially the same diameter and being spaced apart one from the other in a circumferential direction and defining outside adjacent roller teeth having substantially equal intervals therebetween, one of the said plurality of roller teeth being one less in number than the number of the other of said plurality of roller teeth, said inside body member being provided with a plurality of outwardly facing roller recesses into which said inside roller teeth may be respectively mounted, said outside body member being provided with a plurality of inwardly facing roller recesses into which said outside roller teeth may be respectively mounted, said inside and said outside roller teeth providing a mesh relationship therebetween, one of said body members having a plurality of longitudinally extending concave surfaces respectively disposed between and in parallel relation to said adjacent roller teeth thereof, at least one of said concave surfaces and at least a roller tooth in the other of said body members being disposed to engage each other in said mesh relationship and provide a contact engagement therebetween, each of said roller teeth in one of said plurality of roller teeth having a diameter greater than the respective intervals between the adjacent roller teeth in the other of said plurality of roller teeth.

BRIEF DESCRIPTION OF THE DRAWINGS

Other objects and a fuller understanding of my invention may be had by referring to the following description and claims, taken in conjunction with the accompanying drawings, in which:

DESCRIPTION OF THE PREFERRED EMBODIMENT

Figure 4:
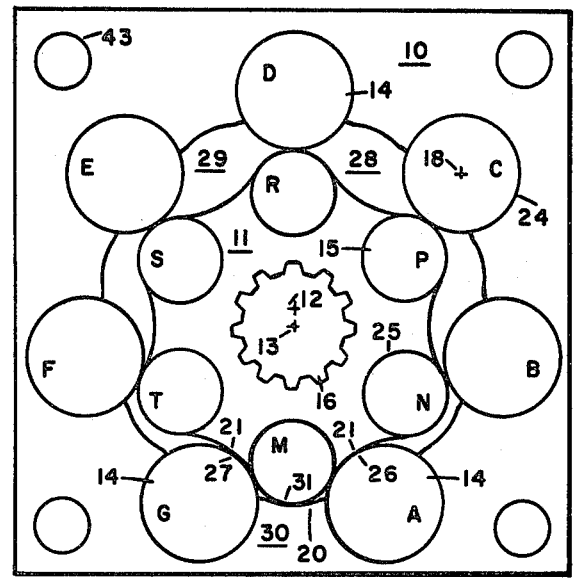
FIG. 4 is a combination view of both the outside and inside body members, the valve passageways not being shown to avoid overlapping and crossing of lines.

As shown in FIG. 4, my combination roller tooth set comprises an outside body member 10 having a first longitudinally extending body axis 12 and an inside body member 11 having a second longitudinally extending body axis 13 substantially parallel to said first body axis 12 and displaced therefrom. In the description, it is assumed that the outside body member 10 is stationary and that the inside body member 11 is movable relative thereto. The movement of the inside body member 11 is disposed to define an orbital cycle.

As shown, there are seven (7) outside roller teeth 14 and six (6) inside roller teeth 15, making a tooth ratio of seven to six. It is appreciated that other tooth ratios may be used. The total of the inside roller teeth is one less in number than that of the outside roller teeth.

Figure 3:
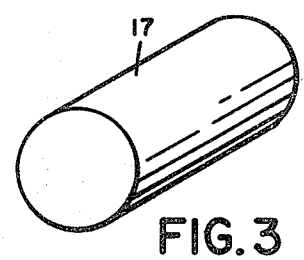
FIG. 3 is a perspective view of a cylindrical roller tooth.

The roller teeth may comprise cylindrical elements mounted in fragmental roller recesses having openings through which the cylindrical elements may protrude and form the roller teeth. A roller element is shown in FIG. 3 and is identified by the reference character 17. The roller recesses for the outside roller teeth 14 are identified by the reference character 24. The roller recesses for the inside roller teeth 15 are identified by the reference character 25. The roller teeth may roll or turn against each other and greatly reduce tooth wear and tooth friction.

The inside body member 11 is provided with torque, transmitting gear teeth 16 into which a tooth-head (not shown) of a universal shaft may be mounted to transmit torque to and from the inside body member. The universal shaft is disposed to have a tooth-head at its other end and is adapted to be connected to a main shaft having a longitudinal axis in axial alignment with the body axis 12 of the outside body member 10. The main shaft is connected to drive a commutating valve at the same rotation as that of the inside body member 11, all being connected together.

The roller teeth 14 for the outside body member 10, all have the same tooth diameter with respect to each other and the roller teeth 15 for the inside body member 11, all have the same tooth diameter with respect to each other. The size of the roller teeth 14 and 15 with respect to each other may be the same, or one may be larger than the other. Preferably, the diameter for the inside roller teeth 15 may be made smaller than the diameter for the outside roller teeth 14. This provides more room and strength for the torque transmitting gear teeth 16.

The outside roller teeth 14 respectively define individual roller axes 18 substantially equally spaced apart, one from the other, in a circumferential direction around the first body axis 12 as a center. In a like manner, the inside roller teeth 15 respectively define individual roller axes 19 substantially equally spaced apart, one from the other, in a circumferential direction around the second body axis 13 as a center. The outside roller teeth 14 face inwardly and the inside roller teeth face outwardly.

From the above, it is seen that all the outside roller teeth 14 are spaced apart, one from the other, in a circumferential direction and define outside adjacent roller teeth having substantially equal outside intervals 22 therebetween. Likewise, all the inside roller teeth 15 are spaced apart, one from the other, in a circumferential direction and define inside adjacent roller teeth 15 having substantially equal inside intervals 23 therebetween. The roller teeth in each of the body members 10 and 11 respectively have a diameter greater than the respective intervals between the adjacent roller teeth in the other of said body members. The purpose of this is to limit the extent that the roller teeth may mesh with each other.

My outside and inside roller teeth 14 and 15, in combination with the outside and inside body members 10 and 11 are disposed to form two fluid chambers therebetween, identified generally by the reference characters 28 and 29. The fluid chambers 28 and 29 may be further explained by noting the fact that in FIG. 4 the outside roller teeth 14 are respectively identified by the letters A to G, inclusive, and that the inside roller teeth 15 are respectively identified by the letters M, N, P, R, S and T. The disposition of the roller teeth in FIG. 4, is that of a starting position which occurs at the beginning of each orbital cycle. The starting position defines a mesh relationship and renews or recycles itself forty-two (42) times for each complete rotational movement (360 degrees) of the inside body member. The mesh relationship is identified generally by the reference character 30.

It is to be noted that the two fluid chambers 28 and 29 occupy the circumferential space between the inside and outside body members 10 and 11 and are sealingly separated, one from the other, at two circumferential places. The first separation is defined by the engagement effected between the two teeth R and D. The second separation is defined by the engagement effected in the mesh relationship 30. When the fluid chamber 28 is acting as an inlet chamber and the fluid chamber 29 as an outlet chamber, the commutated passageways, identified by the reference characters 32, 33 and 34 are operating as supply passages and the commutated passageways, identified by the reference characters 36, 37 and 38 are operating as exhaust passages. The commutated passageway, identified by the reference character 35 is operating as a closed passage. When my combination roller set is operated as a motor, under the above described conditions, the inside body member 11 is urged by fluid pressure to rotate in a counterclockwise direction about its own body axis 13 and, at the same time, urged to orbit in a clockwise direction where its own body axis 13 orbits around the body axis 12 of the outside body member 10.

My inside body member 11 is provided with a plurality of longitudinally extending concave surfaces 21 respectively disposed between, and in parallel relation to, said inside roller teeth 15 thereof. In a like fashion, my outside body member 10 is provided with a plurality of longitudinally extending concave surfaces 20 respectively disposed between, and in parallel relation to, said outside roller teeth 14 thereof. The concave surfaces 20 may be referred to as outside concave surfaces and the concave surfaces 21 as inside concave surfaces. Both concave surfaces are shown in profile. Each concave surface comprises a longitudinal extending portion of a cylindrical surface and may be readily machined in the body members by standard turning machines having turning centers. Thus, the concave surfaces are all geometric surfaces. In FIG. 4 it may be explained that at least one of said inside concave surfaces 21 in said inside body member 11 and at least an outside roller tooth 14, for example tooth A, in said outside body member 10, is disposed to engage each other in said mesh relationship and provide a contact engagement 26 therebetween. A similar contact engagement 27 is provided with the outside roller tooth G. It may also be explained that at least one of said outside concave surfaces 20 in said outside body member 10 and at least an inside roller tooth 15 in said outside body member 11, is disposed to engage each other in said mesh relationship and provide a contact engagement 31 therebetween. The contact engagements 26, 27 and 31 respectively provide for sealingly separating the two fluid chambers 28 and 29 in said mesh relationship 30.

Specifically, the mesh relationship 30 includes a group of three roller teeth comprising two adjacent outside roller teeth A and G and a single inside roller tooth M disposed therebetween. In addition to the group of three roller teeth, there are a plurality of neighboring pairs of roller teeth. Each of said plurality of neighboring pairs of roller teeth comprise an inside roller tooth and an outside roller tooth. The neighboring pairs of roller teeth may be identified as NB, PC, RD, SE, and TF. The contact engagements 26, 27 and 31 are respectively disposed to support the inside roller teeth N, P, R, S and T relative to said outside roller teeth B, C, D, E and F. The support provided by the contact engagements is disposed to effect a good sealing engagement between the neighboring pairs of roller teeth. It is to be appreciated that the contact engagements 26, 27 and 31, besides effecting a sealing engagement between the plurality of neighboring pairs of roller teeth, operated to support the body members 10 and 11 relative to each other and define said orbital cycle.

Figure 1:
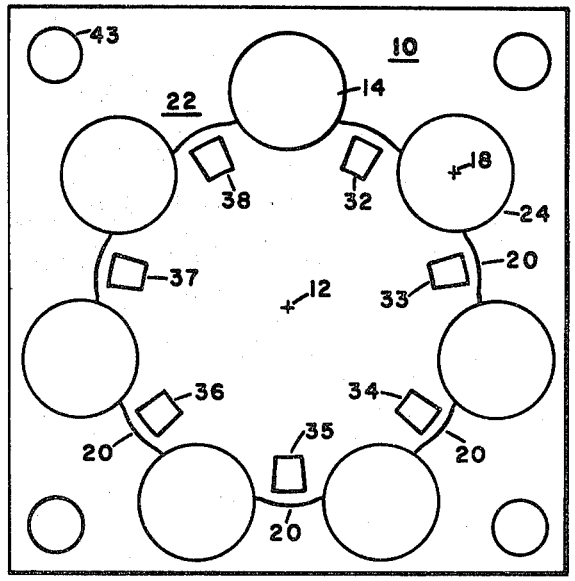
FIG. 1 is a diagrammatical profile view of my outside body member showing concave surfaces between the roller teeth, wherein the circles represent the cylindrical rollers respectively mounted in the corresponding recesses provided therein, the valve passageways are also respectively shown in a side enclosure, square valve plate, as a pie-outline between the outside roller teeth.
Figure 2:
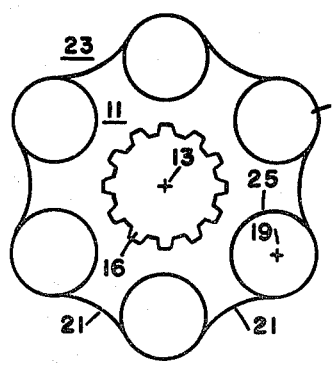
FIG. 2 is a corresponding diagrammatical profile view of my inside body member showing concave surface between the roller teeth.

In FIGS. 1, 2 and 4, the diameter of the roller recesses 24 in the outside body member 10 is substantially the same as that of the roller teeth 14 mounted therein. Likewise, the diameter of the roller recesses 25 in the inside body member 11 is substantially the same as that of the roller teeth 15 mounted therein. In both mountings, the recesses and the roller teeth mounted therein provide a firm rollable fit.

Figure 5:
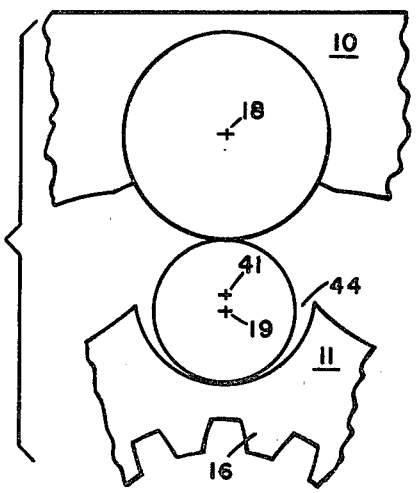
FIG. 5 is a combined drawing respectively showing an enlarged fragmentary view of my inside and outside body members, wherein the inside body member has a distended circumferential recess provided therein.

FIG. 5 is a combined drawing respectively showing an enlarged fragmentary view of my inside and outside body members, wherein said inside body member is designed to have distended circumferential recesses provided therein. A roller tooth in said distended circumferential recess is free to move in a circumferential direction to the extent that it may contact a next adjacent tooth in said outside body members. The distended recess may be provided by slightly machining it to a larger diameter than that of the roller tooth mounted therein and at a radially displaced center 41, whereby the central bottom portion of the distended recesses would have the same radial dimension for the roller tooth mounted therein as that for a firm rollable fit. It will be seen that as a roller tooth tends to move circumferentially, under the force of pressure, the curvature of the bottom portion of the recess tends to urge the roller tooth tight against the adjacent outside roller tooth. This distended recess may be referred to as a radial offset recess.

Figure 6:
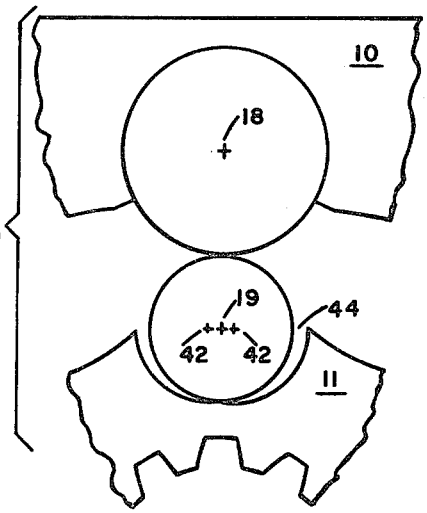
FIG. 6 is a combined drawing similar to FIG. 5, showing a modified distended recess.

FIG. 6 is a combined drawing like FIG. 5 and shows a modified distended recess, which may be provided by slightly machining it with a circumferential motion to both sides of the recess and defining two circumferentially displaced centers 42, whereby the central bottom portion of the modified distended recess would have the same radial dimension for the roller tooth mounted therein as that for a firm rollable fit. This modified distended recess may be referred to as a circumferential offset recess.

In both types of distended recesses, the roller tooth mounted therein is urged, under the force of fluid pressure acting thereon, to tightly engage the next adjacent tooth in the other of said body members. Fluid leakage is thereby further reduced.

In the enlarges FIGS. 5 and 6, the side tolerance space between the distended circumferential recess and a roller tooth mounted therein is identified by the reference character 44. This side tolerance space may vary with the production tolerances of center-machining. In actual practice, the extent of the side tolerance space may be as small as two thousandth of an inch or a fractional part thereof, provided the roller tooth mountered therein is free to contact the next adjacent tooth of the other of said body members.

It is noted that in FIGS. 5 and 6, the fragmentary views show the distended circumferential recess as being provided in the inside body member 11. It is, of course, realized that the distended circumferential recess may also be provided in the outside body member 10.

The object of a distended circumferential recess is to provide additional aid in preventing leakage from flowing from one fluid chamber to the other in the mesh relationship. Under the force of fluid pressure, the roller tooth in a distended recess is urged to distensibly move and contact the next adjacent outside roller tooth and provide an extra fluid seal. In my distended circumferential recesses, the central bottom portion has the same radial dimension for the roller tooth mounted therein as that for a firm rollable fit. This construction thus provides a firm radial support for the roller teeth and yet permits circumferential movement to effect a tight fluid seal.

The outside body member 10 is preferably square and may be center-machined from a flat plate cut from a plate bar stock. Similarly, the inside body member 11 may be center-machined from a flat disk cut from a round bar stock. The body members and the roller teeth are preferably rendered hard by heat treatment to prolong their wear life. The two fluid chambers 28 and 29 are enclosed on opposite sides of the body members 10 and 11 by square enclosure plates, (not shown) being the same size as the square outside body member 10. One of the side enclosure plates is provided with the fluid passageways, 32 to 38, inclusive and constitutes a stationary valve plate. The other side enclosure plate comprises an end plate. The side enclosure plates and the square outside body member 10 may be provided with mounting holes, see holes 43 in FIGS. 1 and 4, through which bolts or cap screws may be mounted to secure the assembly together. The displacement volume may be determined by fixing the axial width of the roller tooth.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An inside and an outside combination roller tooth set comprising an inside rotary body member having a longitudinal rotary body axis, an outside stationary body member surrounding said inside rotary body member and having a longitudinal stationary body axis substantially parallel to said rotary body axis, said rotary body axis and said stationary body axis being displaced from each other, said inside rotary body member being internally unsupported and having freedom of movement to provide a rotational movement about its own rotary body axis and a recycling movement about said stationary body axis, said inside rotary body member having therein a plurality of inside roller teeth disposed substantially parallel to and extending circumferentially around said rotary body axis as a center, all of said inside roller teeth having substantially the same diameter and being spaced apart one from the other in a circumferential direction and defining inside adjacent roller teeth having substantially equal intervals therebetween, said outside body member having therein a plurality of outside roller teeth disposed substantially parallel to and extending circumferentially around said stationary body axis as a center, all of said outside roller teeth having substantially the same diameter and being spaced apart one from the other in a circumferential direction and defining outside adjacent roller teeth having substantially equal intervals therebetween, one of the said plurality of roller teeth being one less in number than the number of the other of said plurality of roller teeth, said inside body member being provided with a plurality of outwardly facing roller recesses into which said inside roller teeth may be respectively mounted, said outside body member being provided with a plurality of inwardly facing roller recesses into which said outside roller teeth may be respectively mounted, said inside and said outside roller teeth facing each other and defining a plurality of contactable cylindrical roller teeth, one of said body members having a plurality of longitudinally extending geometric concave surfaces respectively disposed between and in parallel relation to said adjacent roller teeth thereof, at least one of said geometric concave surfaces and at least a roller tooth in the other of said body members being disposed to engage each other and provide a concave-to-convex contact engagement therebetween, each of said roller teeth in one of said plurality of roller teeth having a diameter greater than the respective intervals between the adjacent roller teeth in the other of said plurality of roller teeth, said concave-to-convex contact engagement in combination with said plurality of contactable cylindrical roller teeth externally and solely supporting said inside rotary body member for rotational movement about its own rotary body axis and for recycling movement about said stationary body axis.

2. The structure of claim 1, wherein all of said roller recesses in one of said members respectively defining a distended radially offset recess, a roller tooth in said distended recess being free to move in a circumferential direction to the extent that it may contact a next adjacent tooth of said other body member.

3. The structure of claim 1, wherein all of said recesses in one of said body members respectively define a distended circumferential off-set recess, a roller tooth in said distended recess being free to move in a circumferential direction to the extent that it may contact a next adjacent tooth of said other body member.

* * * * *